Patented May 10, 1949

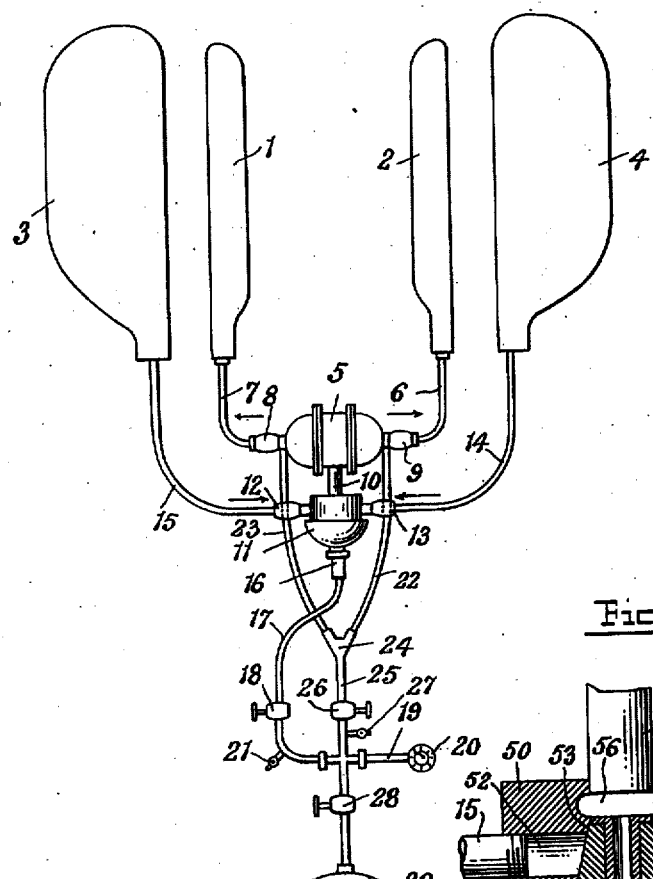
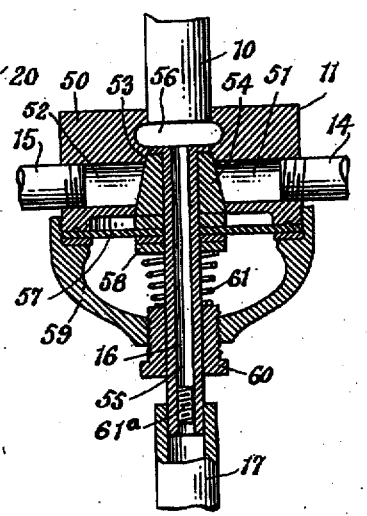

2,469,962

UNITED STATES PATENT OFFICE 2,469,962

PNEUMATIC SUSPENSION MEANS FOR VEHICLES

Rene Gouirand, New York, N. Y.

Application March 2, 1945, Serial No. 580,655

2 Claims. (Cl. 267—11)

This invention relates to pneumatic suspension means for use in connection with vehicles, and more particularly motor vehicles, and including trailers. Examples of the types of structures to which the invention relates will be found in my Patents Nos. 1,555,199 dated September 29, 1925, and 2,042,596 dated June 2, 1936.

In the above mentioned patents is shown a pneumatic suspension means wherein the axle of the vehicle provided with the means is disposed between air-filled cushions which absorb road shocks by the cushioning effect of the pneumatic pressure within the cushions.

An object of the present invention is to provide a stabilizing and compensating means by which the air pressure in the several cushions will be permitted to shift as required under various road conditions; which will be restored uniformly in the various air cushions after the imposition of a shock, and by means of which a stable control of the air pressure will be effected. I also secure the desired effects without the use of pistons or other sliding means since such devices often tend to leak and have been found inefficient in operation.

The invention further contemplates the provision of a closed compensating chamber divided into several compartments by means of flexible walls or diaphragms which expand under the air pressure of abnormal force to thereby shift the air in other compartments of the compensator toward the cushions which have not been compressed. The invention contemplates other features to be hereinafter pointed out and particularly set forth in the claims appended hereto.

In the accompanying drawing, wherein an illustrative embodiment of the invention is disclosed, Fig. 1 is a diagrammatic view of the improved structure; Fig. 2 is a sectional view through the compensator, and Fig. 3 is a sectional view through the stabilizer valve.

In a pneumatic suspension device of the character to which the present invention relates, the frame of the chassis of the vehicle (and in the present instance it may be a trailer) is attached to two upper air cushions, one of each of which is disposed adjacent to each of the two wheels of the trailer. These upper air cushions are indicated at 3 and 4. Secured below the axle and enclosed with the upper air cushions in a suitable housing such as disclosed in my patents herein mentioned, are the lower air cushions, indicated at 1 and 2. The manner in which these cushions are mounted and supported is disclosed in detail in the above mentioned patents, and such supporting and mounting can be carried out in various other ways, this being largely dependent upon the structure of the vehicle to which the system is to be applied.

At 5, is shown a compensating device, the details of which are shown in Fig. 2. It will be therein seen that the same consists of a casing having a cylindrical central portion 21 provided with radial flanges 24 which are secured by the bolts 40 to flanges 30 extending radially from the domed end members 35 and 36 of the casing. Clamped between the flanges 24 and 30 are the marginal edge portions of a pair of flexible diaphragms 41 and 42. These diaphragms thus serve as flexible partition members or walls acting to divide the interior of the compensator casing into three separate chambers or compartments as indicated at 43, 44 and 45. The diaphragms may be made of rubber or an equivalent flexible material so that they will flex under air pressure as hereafter explained. The chamber 43 is provided with a nipple 47 which connects to a tube or conduit 8, through a slow-leak check valve 9 which opens in the direction of the arrow located adjacent to it on the drawing, the conduit 8 leading into the lower air cushion indicated at 2.

The chamber 45 has a nipple 46 which connects to a tube or conduit 7, through a slow-leak check valve 8 which opens in the direction of the arrow located adjacent to it on the drawing, the conduit 7 leading to the second lower air cushion 1. Leading from the respective chambers 43 and 45 are the tubes 27 and 28 which connect to a Y-shaped fitting 24 joined to a tube or conduit 25 leading from an air-supply tank 29 mounted on the truck or tractor to which the trailer is attached. Located in the tube or conduit 25 are hand valves 26 and 29 which are utilized as hereinafter described. The slow leak check valves indicated at 6 and 9, and those shown at 12 and 13 to be presently mentioned, may be of the construction fully described in my Patent No. 1,555,199 or they may be of any similarly-operating type which opens quickly and fully in one direction and when seated or closed permits slow air leakage past the valve.

The central compartment 44 of the casing 5, of that compartment which is situated between the two diaphragms 41 and 42, is provided with the nipple 48 connected by the pipe 10 to a stabilizing valve 11, the details of which are shown in Fig. 3. The stabilizing valve includes a housing 50 provided with diametrically opposite, axially aligned passages 51 and 52, between which is located a valve seat 53 against which a conical plug valve 54 is adapted to seat. Plug valve 54 is secured on a tubular stem 16 having its interior passage 55 extending through the plug valve 54 and communicating with a chamber 56 in the valve casing and into which one end of the pipe 10 enters. A flexible diaphragm 57 aiding in normally holding the valve 54 on its seat is secured to the stem 16 of the valve by a stop 58 on the stem 16 and by which the central part of the diaphragm 57 is clamped between said nut and the body 54 of the plug valve. The marginal edge portion of the diaphragm 57 is clamped between the casing or housing 50 and a threaded-on domed cap member 59, having a central opening in which an adjusting nut 60 is threadably received, said nut 60 having a central passage through which the tubular stem 16 is slidable upon opening and closing movements of the plug valve 54.

A coil spring 61 is located between the adjusting nut 60 and the stop 58 so that by adjustment of the nut 60 the compression of the spring 61 may be controlled to regulate the opening of the valve 54 under predetermined air pressure to thus establish communication between the passages 51 and 52. Located in the passage 55 extending through the tubular stem 16, is a valve core 61a of the Schrader or other equivalent tire type. It will be noted that passage 51 connects, through a slow-leak check valve 13 opening as shown by the arrow located adjacent to it in the drawing, to a tube or conduit 13 which leads into the upper air cushion 4, while passage 52 connects through a slow-leak check valve 12 opening as shown by the arrow placed adjacent to it in the drawing, to a tube or conduit 15 which leads into the second upper air cushion, or that shown at 3.

The stem 16 connects to a tube or conduit 17 which extends to the tube 25, with the hand valve 18 as well as a pressure relief valve 21 located between the point of connection of the tube 17 to the stem 16 and the connection of tube 17 to the tube 25, the latter connection of the tube 17 to the tube 25 being between the two hand valves 26 and 28. A pressure gauge 20 is connected by the tube 19 to the tube 25, and a pressure relief valve 27 is also located in the tube 25 at the point indicated.

From the foregoing, the operation of the structure thus far described will be readily understood. When it is desired to inflate all of the air cushions to the required pressure, hand valves 18, 26 and 28 are opened and the air will flow from the supply tank 29 through tube 25 and tubes 22 and 23 and through the slow-leak check valves 8 and 9 and through the tubes 6 and 7 to fill the air cushions 1 and 2 to the required pressure, as well as fill the chambers 43 and 45 of the compensator. Air will also flow through tube 25 and through tube 17 and thus through the stem 16 and also through the plug valve 54, which is closed at this time and remains closed until sufficient pressure builds up in chamber 44 to an extent necessary to overcome the force of spring 61, whereupon the valve 54 will open and establish communication between passages 51 and 52 and allow the air to then flow through the tubes 14 and 15 to fill the air cushions 3 and 4 to the required pressure. The valve 54 then remains open and stays open as long as the pressure is sufficient to overcome the spring 61.

When the cushions have been inflated to the required pressure as indicated by the gauge 20, in the manner described, the hand valves 18, 26 and 28 are all shut off and the vehicle is then ready for operation. It will be understood that either set of cushions may be inflated independently of the other set. That is to say, by shutting off the hand valve 18 and allowing the hand valves 26 and 28 to remain open, the air will flow into the lower cushions only. Also by closing valve 26 and allowing valves 18 and 28 to remain open, the air will flow into the upper cushions only.

When shock is encountered by a wheel, say for example that located adjacent to the pair of air cushions shown at 1 and 3, the shock will be imposed upon the upper cushion 3 and the air therein will be compressed, causing some of it to flow into the central compartment or chamber 44 of the compensating device. This will cause the flexible diaphragms 41 and 42 to be spread apart, thus forcing some of the air in the chambers 43 and 45 into the lower cushions. As the vehicle body tends to rebound because of the elasticity of the air in the cushion, the pressure in the upper cushion will be decreased, thus allowing the air to slowly return into the upper cushion from the lower cushion until the pressures in said cushions are equalized. The slow-leak check valves permit the slow return flow of the displaced air so that violent rebound is avoided.

Through the arrangement disclosed, it will be clear that the imposition of compression on any one of the air cushions will cause displacement of some of the air in the compressed cushion to shift it to the compartment in the compensating device to which the compressed cushion is connected. The thrust of the displaced air on one or the other, or on both of the diaphragms will result in the air on the opposite side of the diaphragm that is flexed, to be forced toward the companion cushion of that which was compressed, and the resultant slow return of the displaced air through the slow-leak check valves will restore equal pressure in all of the cushions without violent rebound.

By the employment of flexible diaphragms in a closed compensating chamber, the use of pistons or other sliding means is dispensed with, and the wear and possibility of leakage incidental to such sliding elements is avoided. Through the arrangement of the hand valves in the pipe lines, the upper and lower air cushions can be independently air-filled, or in the event of leakage or a puncture in one set of cushions the other set will remain unaffected.

While I have shown an embodiment of my invention, it is obvious that the same is not to be restricted thereto but is broad enough to cover all structures coming within the scope of the annexed claims.

What I claim is:

1. In a pneumatic suspension means for vehicles, a pair of upper air cushions, a pair of lower air cushions, a compensating device including a chamber divided into three compartments by a pair of spaced flexible diaphragms, the two upper cushions being connected by conduit means into the central one of the three compartments, each of the lower cushions being connected by conduit means into one of the other two compartments, whereby an expulsion of air in the upper cushions will expand the side walls of the central compartment to cause air in the two other compartments to be forced therefrom toward and into the lower cushions, valve means located between the lower cushions and the compartments to which said lower cushions are connected for causing slow return flow of said air into said compartments, and a valve located between the central compartment and the two upper cushions for causing equalization of pressure in said two cushions.

2. In a pneumatic suspension means for vehicles, a pair of upper air-filled cushions adapted for connection to a chassis frame, a pair of lower air-filled cushions adapted for connection to the running gear, a compensating chamber consisting of a casing divided into a group of separate compartments by flexible walls, the upper cushions being connected into the central compartment, the lower cushions being each connected into an end compartment, the latter compartments being separated from the central compartment by said flexible walls whereby a compression of air in the central compartment by pressure on the upper cushions will cause flexure of said flexible walls and cause said walls to displace air from the end compartments, and valve means in the connections to the lower cushions through which said displaced air will rapidly pass when said walls are flexed and through which said air will slowly return to the compartments from which it was displaced.

3. In a pneumatic suspension means, a pair of upper and a pair of lower air cushions, a compensator consisting of a casing divided into a plurality of compartments by flexible diaphragms, conduits between one of the compartments and the two upper air cushions, conduits between each lower air cushion and compartments located respectively at opposite sides of the compartment to which the upper air cushions are connected, whereby a compression of either of the upper air cushions will cause a displacement of some of the air from its interior into the compartment to which said cushion is connected, the increase of air in said compartment causing flexure of the diaphragm between it and an adjacent compartment to cause a displacement of air from the latter compartment to the lower cushion to which said compartment is connected, a stabilizer valve connected into the compartment to which the two upper air cushions are connected, said valve including a passage connecting the two upper cushions, a valve seat in said passage, a valve head seating against said seat to shut off communication between the two upper cushions, and means for holding said valve head in seated position when air pressure in said adjacent compartment is below a predetermined level.

RENE GOUIRAND.

REFERENCES CITED

The following references are of record in the file of this patent:

UNITED STATES PATENTS

| Number | Name | Date |
| --- | --- | --- |
| 2,003,511 | Mercier | June 4, 1935 |
| 2,042,596 | Gouirand | June 2, 1936 |
| 2,113,071 | Allen | Apr. 5, 1938 |
| 2,115,159 | Dupuy et al. | Apr. 26, 1938 |
| 2,290,337 | Knauth | July 21, 1942 |

FOREIGN PATENTS

| Number | Country | Date |
| --- | --- | --- |
| 810,925 | France | Jan. 9, 1937 |